C. R. HOLDEN.
RAILWAY ROAD BED CONSTRUCTION.
APPLICATION FILED OCT. 12, 1908. RENEWED DEC. 13, 1909.
964,516.
Patented July 19, 1910.
4 SHEETS—SHEET 1.
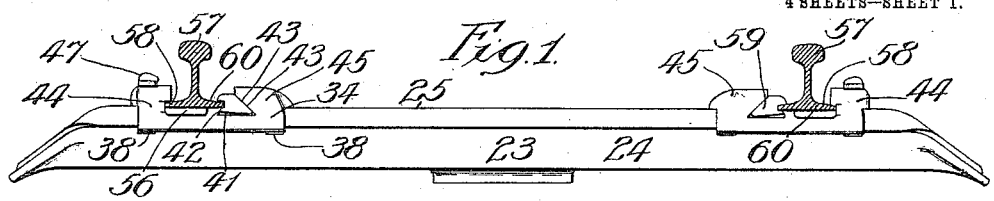
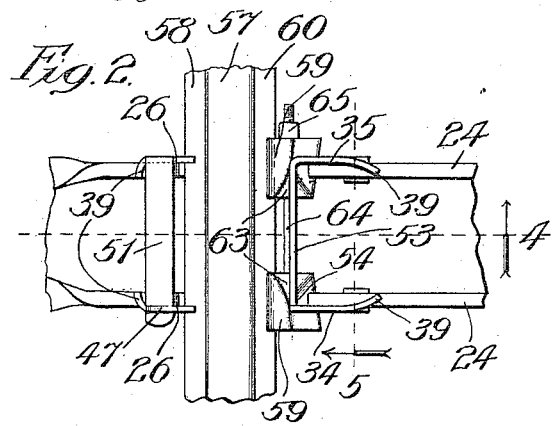
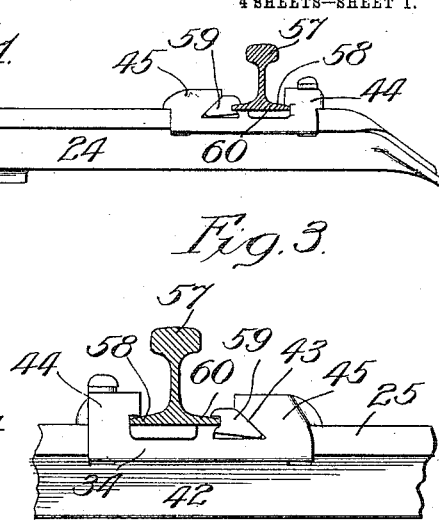
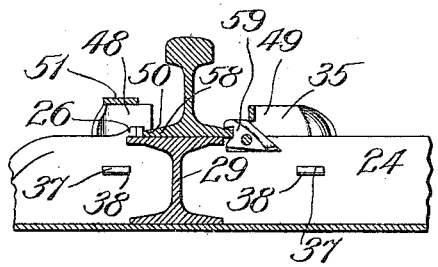
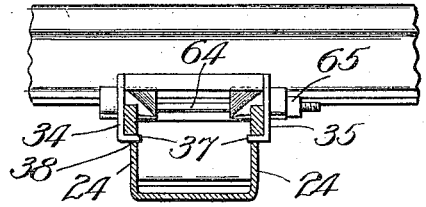
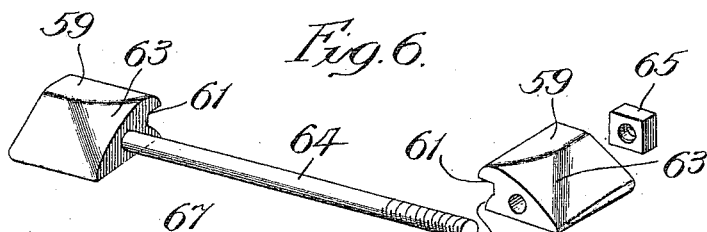
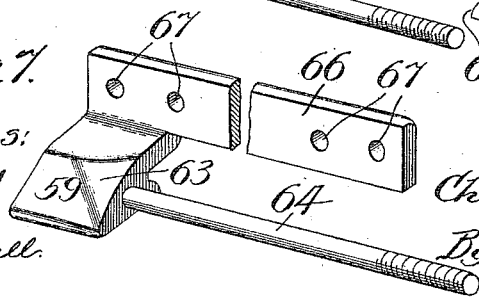
Witnesses:
Inventor: Charles R. Holden

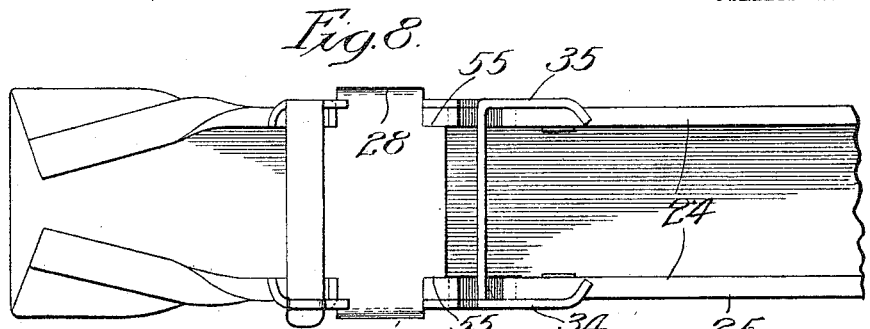
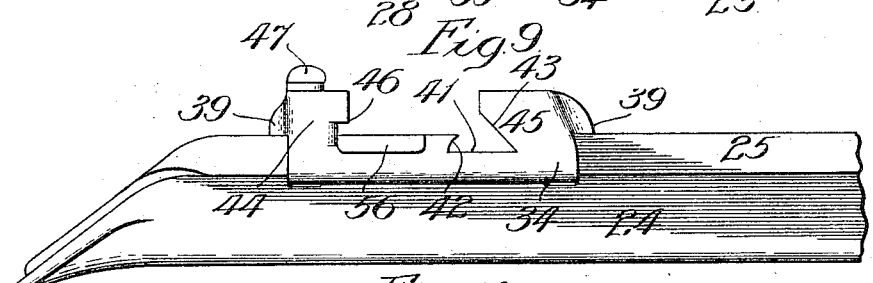
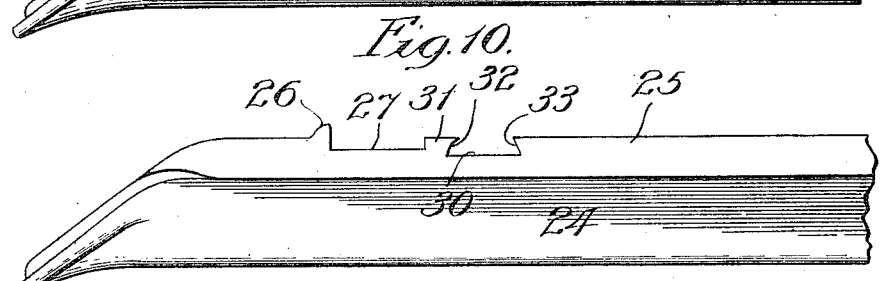
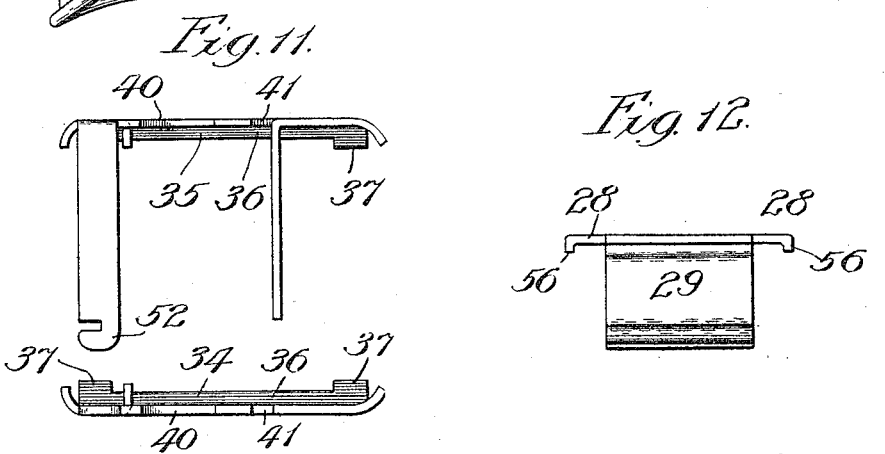

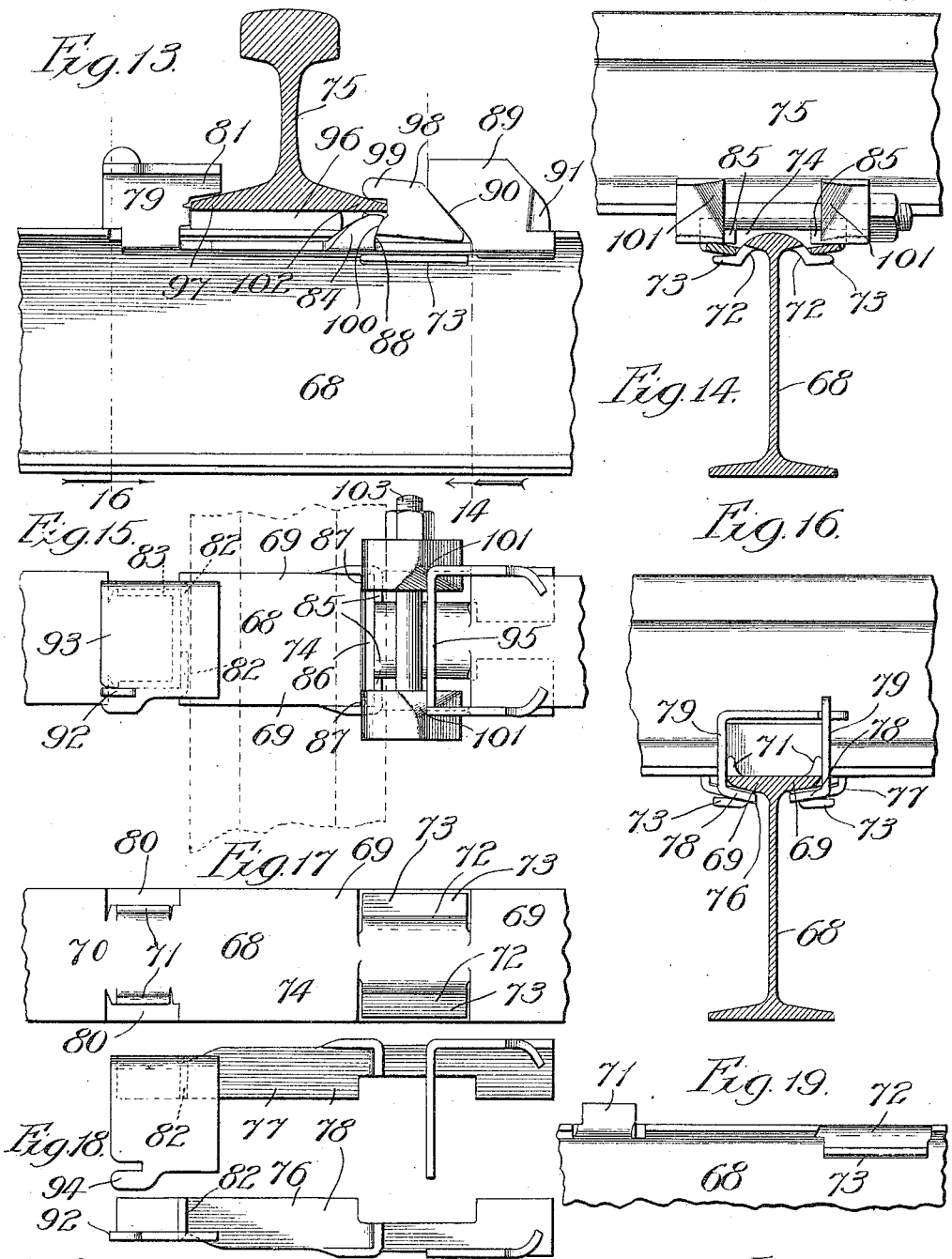

C. R. HOLDEN.
RAILWAY ROAD BED CONSTRUCTION.
APPLICATION FILED OCT. 12, 1908. RENEWED DEC. 13, 1909.

964,516.

Patented July 19, 1910.
4 SHEETS—SHEET 4.

Witnesses:
Inventor:
Charles R. Holden.

UNITED STATES PATENT OFFICE.

CHARLES R. HOLDEN, OF CHICAGO, ILLINOIS.

RAILWAY-ROAD-BED CONSTRUCTION.

964,516. Specification of Letters Patent. Patented July 19, 1910.

Application filed October 12, 1908, Serial No. 457,279. Renewed December 13, 1909. Serial No. 532,903.

*To all whom it may concern:*

Be it known that I, CHARLES R. HOLDEN, a citizen of the United States, residing at Chicago, in the county of Cook and State of Illinois, have invented a new and useful Improvement in Railway-Road-Bed Construction, of which the following is a specification.

My invention relates, more particularly, to improvements in means for releasably securing to railway-ties the rails for forming the track; and my primary objects are to provide new and improved means for the purpose above stated which shall be relatively economical to manufacture, shall serve to permit the rails to be readily and easily locked in a secure manner on the ties, and shall involve the use of the minimum number of fastening bolts, or the like fastening devices, for holding the rail in place.

Figure 20:
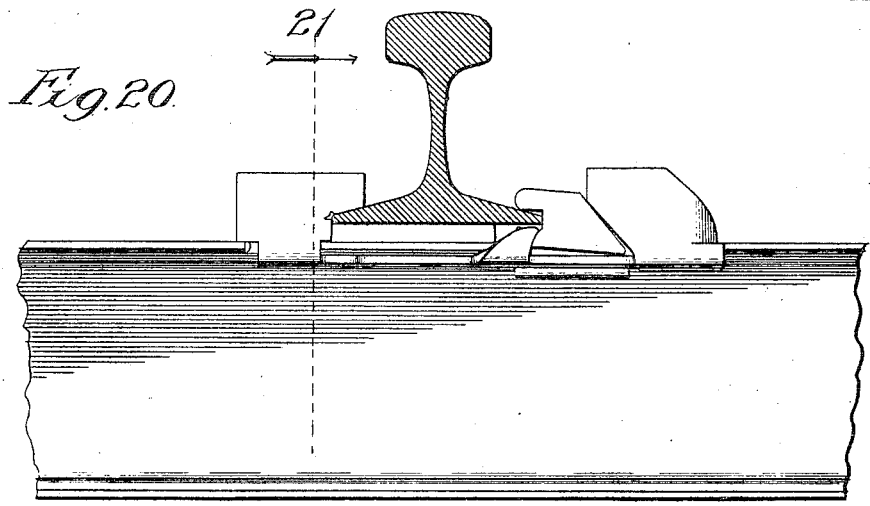
Figure 21:
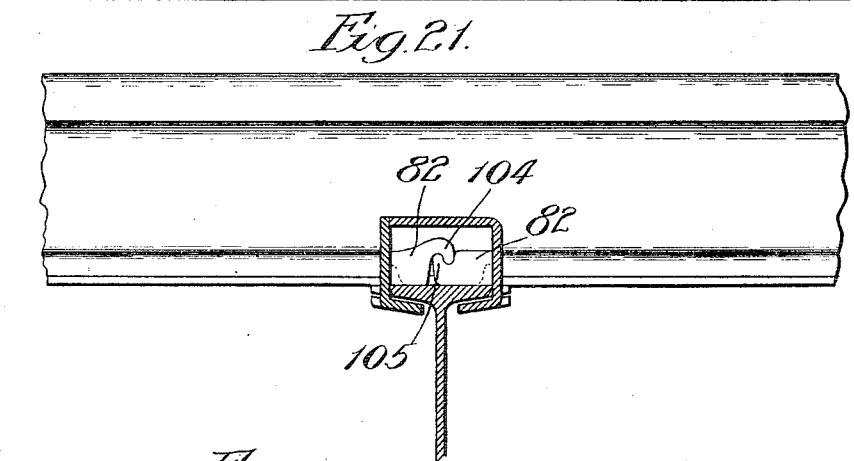

Referring to the accompanying drawings—Figure 1 is a view in side elevation of a tie of the U-shape variety, showing two rails, in cross-section, secured to the tie by my improved fastening means. Fig. 2 is an enlarged plan view of the left-hand end-portion of the construction illustrated in Fig. 1. Fig. 3 is a broken view, similar to Fig. 1, of the left-hand portion of the construction therein represented, this view being enlarged to more clearly illustrate details of construction. Fig. 4 is a section taken at the line 4 on Fig. 2 and viewed in the direction of the arrow. Fig. 5 is a section taken at the line 5 on Fig. 2 and viewed in the direction of the arrow. Fig. 6 is a perspective view of the split-wedge construction of fastening device employed, the parts thereof being shown in disassembled relation. Fig. 7 is a view like that of Fig. 6 showing a fish-plate on one of the wedges. Fig. 8 is a plan view of the left-hand end-portion of the construction illustrated in Fig. 1 with the rail and wedge-keys omitted. Fig. 9 is a view in side elevation of the construction illustrated in Fig. 8. Fig. 10 is a view in side elevation of the left-hand end-portion of the tie-proper illustrated in Fig. 9, the clips for the tie being omitted. Fig. 11 is a plan view of the tie-clips showing them in disassembled relation preliminary to application to the tie. Fig. 12 is a view in side elevation of a seating-block employed. Fig. 13 is a view in side elevation of one end of an I-beam tie showing a rail secured thereon by my improved fastening means. Fig. 14 is a section taken at the line 14 on Fig. 13 and viewed in the direction of the arrow. Fig. 15 is a plan view of the construction illustrated in Fig. 13 showing a rail in position thereon by dotted lines. Fig. 16 is a section taken at the line 16 on Fig. 13 and viewed in the direction of the arrow. Fig. 17 is a plan view of one end of an I-beam tie of a construction adapting it to receive my improved fastening means. Fig. 18 is a plan view of the pair of separable clips forming a portion of the fastening-means illustrated in Fig. 15, these clips being shown in disassembled relation. Fig. 19 is a view in side elevation of the portion of the tie represented in Fig. 17. Fig. 20 is a view in side elevation of an I-beam tie showing a rail secured thereto by a modification of the fastening-means illustrated in Fig. 13. Fig. 21 is a section taken at the line 21 on Fig. 20 and viewed in the direction of the arrow; and Fig. 22, a plan view of the pair of separable clips forming the fastening-means illustrated in Figs. 20 and 21.

Referring to Figs. 1 to 12, inclusive, the tie, which is represented at 23, is of the U-shape type affording the upwardly extending flanges 24 which, in the construction shown, have ribs 25 of rectangular shape in cross-section extending from their outer sides at their upper margins throughout the length of the tie. At opposite end-portions of the tie lugs 26 forming abutments, are struck from the metal of both flanges 24. Each flange 24 contains a recess 27 in its upper edge-portion adjacent to the lugs 26 into which the end-portions 28 of a block 29, hereinafter more fully described, rest. Each flange 24 also contains a recess 30 which is spaced from the adjacent recess 27 by a lug 31 and contains a curved wall 32 and a tapering wall 33, the walls 32 and 33 of each recess converging upward as represented.

Fitting flatwise against the outer faces of the ribs 25 adjacent to the recesses 27 and 30 are clips in the form of plates 34 and 35, these plates being provided in pairs, one pair at each end of the tie, with inwardly turned flanges 36 extending under the ribs 25, lugs 37 on the flanges 36 extending through openings 38 in the tie-flanges. Each of the plates 34 and 35, which are preferably formed by stamping them from sheet-steel, extends above the upper edge-portion of the tie-proper and has at its opposite ends inwardly turned lips 39, which seat upon the upper edges of the tie-flanges 24. These plates contain recesses 40 and 41 which correspond in shape and size with the respective recesses 27 and 30 in the tie-flanges 24 with which they aline, the curved walls and the straight inclined walls of the recesses 41 being represented at 42 and 43, respectively.

Each of the plates 34 carries two upward extensions 44 and 45 spaced apart as represented, the extensions 44 having undercut portions 46 on one edge and hook-shaped lugs 47 on their upper edge-portions. Each of the plates 35 also contains two upward extensions 48 and 49, spaced apart, the extensions 48 having undercut portions 50, which aline with the undercut portions 46 on the plates 34 opposed to them, and transversely extending arms 51, the outer ends of which are of hook-shape, as represented at 52, for interlocking with the hook-lugs 47 on the opposed plates 34. The extensions 49 on the plates 35 carry arms 53 which extend transversely of the tie and abut at their outer ends against the inner sides of the opposed plates 34, as represented at 54 in Fig. 2.

The blocks 29 fit between the flanges of the tie at points adjacent to the recesses therein, each of said blocks being of I-shape in cross-section and having its extensions 28 contracted and affording shoulders 55, these extensions 28 seating in the recesses 27 and 40 and fitting at depending lugs 56 thereon against the outer sides of the ribs 25. Thus the main portion of each block forms a seat between the flanges for a rail at each end of the tie, and the other portions thereof interlock with the tie-flanges and tend to strengthen the tie-flanges against spreading or buckling.

The rails, as for instance the rails 57, are seated upon the blocks 29 in a position in which their outer flanges 58 fit against the extensions 44 and 48 and under the undercut portions 46 and 50 thereof, in which position they are secured in place by wedge-blocks, or wedge-keys 59, which are introduced into the recesses 30 and 41 from opposite sides of the tie to engage with the inner flanges 60 of the rails 57 and the inclined walls 43 of the recesses 41. Each of the wedge-keys is formed with a shouldered portion 61, a convex surface 62, and a doubly inclined surface 63 which, when the keys are applied to the tie as described, engage, respectively, with the inner flange 60 of the adjacent rail, the adjacent concave surfaces 32 and 42, and the inclined walls 43 of the recesses 41. Bolts 64, preferably formed integrally with one key of each set, extend freely through the other key of the set, and thus the keys of each pair may be drawn tightly together by manipulating nuts 65 on the ends of the bolts 64, the surfaces 63 on the keys 59, in moving against the inclined surfaces 43, causing the keys to be turned down and toward the rail-flanges 60, thereby forcing the shouldered portions 61 of the keys against the inner flanges of the rails and securely locking them in place.

In Fig. 7, one of the keys is shown as provided with a longitudinally extending plate 66 provided with apertures 67, it being designed that this plate serve the function of the ordinary fish-plate when the wedges 59 are positioned on the ties as described, it being understood that if these fish-plates are employed that one will be provided for each set of wedges.

In Figs. 13 to 19, inclusive, my invention is illustrated as embodied in an I-shaped tie represented at 68. In this construction, the upper portion of the tie, which is formed with horizontal flanges 69 and is represented at 70, has a portion of the metal forming its edges slit and bent upward to form two opposed lugs 71 which project above the top surface of the flanges 69. The lateral edges of the flanges 69 also carry two opposed depending lips 72 having horizontal flanges 73 which are formed by slitting the metal of the edge-portions of the flanges 69 and stamping it to the desired shape. The set of lugs 71 are spaced from the lips 72 that a seating surface 74 of sufficient width for a rail, as for instance that represented at 75, may be provided.

Secured to the tie 68 at its flanges 69 on opposite sides thereof are clips 76 and 77, each of which is formed with a horizontal plate-portion 78 which fits under the adjacent tie-flange 69 and rests near one end on the upper surface of the adjacent lip-flange 73, the opposite end of each plate being somewhat restricted in width and carrying an upwardly extending member 79 which fits in the adjacent recess 80 formed by bending the metal of the tie-flanges to produce the lugs 71. Each of the extensions 79 has a shouldered portion 81 and an inwardly turned lip 82 which extends above the tie and transversely thereof and rests against a plate 83 confined between them and the ends of the lugs 71. Each clip intermediate its ends also carries an angular shaped lug 84 which extends above the top surface of the tie, its inwardly turned lip 85 extending into engagement with a plate 86 confined between it and the shoulders 87 formed by cutting the metal to produce the lips 72. Each of the angular lugs 85 is formed with a concave wall 88 for a purpose hereinafter disclosed, and each plate 76 and 77 carries an upwardly projecting member 89 formed with a tapering surface 90 and with an inwardly turned lug 91, the latter extending over the top surface of the adjacent tie-flange 69.

The portion 79 of the clip 76 carries at its top a hook-lug 92, and the member 79 of the clip 77 is provided at one end with a horizontal plate-extension 93 formed with a hook-end 94 adapted to engage the hook-lug 92, and at is other end with a cross-bar 95 which abuts at its outer end against the inner side of the member 89 of the clip 76.

The cut-out portions of the tie are of such dimensions as to permit longitudinal movement of the clips on the tie for purposes of adjustment, the plates 83 and 86 hereinbefore referred to being removable and serving as fillers between the interlocking parts of the clips and the tie. Thus by their use, or omission from use, the gage of track may be varied to conform to different conditions.

It is preferred that the rail seat upon resilient material and I, therefore, show a block 96 of wood, or any other suitable material, resting upon the portion 74 of the tie. The rail seats upon this block and extends at a flange 97 thereof against the lips 82 and under the shoulders 81, in which position it is rigidly clamped by a pair of wedge-keys, or wedge-blocks, 98, these wedge-blocks being the same in construction as the blocks 59. Each of these blocks 98 is provided with a shouldered portion 99, a convex surface 100 and a double inclined surface 101 which engage, respectively, with the inner flange 102 of the rail 75, the adjacent concave wall 88 and the adjacent inclined wall 90, when the keys are moved into position for clamping the rail in place as described of the keys 59, a bolt-device 103 being employed for moving the wedges 98 toward each other. In this construction, the rail may be first placed upon the tie in approximately the position it is intended it should assume when firmly secured thereto. The clips 76 and 77 may then be applied to interlocking position on the tie by first hooking the hook 94 upon the hook 92 and then drawing the free ends of the clips toward each other to cause them to rest upon the upper surfaces of the lip-flanges 73. The filler-block 96 may then be inserted under the rail, whereupon the keys 98 are applied to the clips and moved to rail-flange-engaging position, as described.

It will be noted that in the constructions illustrated in Figs. 1 to 19, inclusive, the clips are secured at one end in position on the tie without the use of any bolt, the desired interlocking of these clips at one end being effected by the hook-devices. The free ends of the clips are firmly drawn and held together against separation by the engagement therewith of the keys 98. Thus the rail is securely held to the tie by the use of only one bolt, and this bolt performs the double function of holding the clips together at their free ends and holding the rail securely to the clips.

Figure 22:
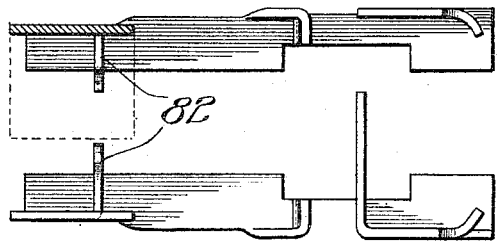

In the constructions represented in Figs. 20 to 22, inclusive, I have illustrated a slight modification of the clips illustrated in Figs. 13 to 19 inclusive. This modification contemplates so changing the position of the hook-devices that the clips instead of being assembled by moving them in a horizontal plane, will be assembled by swinging them, while they maintain parallelism with the tie, toward the latter, and thus in some cases their application to the tie and rail thereon is expedited. In this construction, the extension 93 of the plate 77 and the hook 92 of the plate 76 are omitted, and in their place hooks 104 and 105 are provided on the inner end-portions of the lips 82, these hooks being adapted to interlock transversely of the tie, and thus instead of swinging the clips together at their free outer ends in a horizontal plane with the hooked ends as a pivot, as described of the constructions represented in Figs. 13 to 19, the clips of this modified form are swung upward and toward each other and toward the opposed sides of the tie, in which position they are rigidly clamped in place with the rail thereon by the keys 98 as described of the preceding construction.

It will thus be noted that the employment of my invention as exemplified in the last two constructions described, permits the clips to be applied to the tie and rail after the rail has been positioned on the tie, and permits them to be readily removed therefrom while the rail remains in position. Thus, a rail may be detached from any particular tie, or from either end thereof, with great ease, permitting the tie and securing-means for the rail to be removed from position, and replaced if desired, without disturbing any of the other ties or rail-clamping means thereon.

It will be observed that one of the features of my invention consists in the provision of clips so constructed as to cause them to be releasably locked at one end on the support without the use of clamps, bolts, or other fastening devices, and secured together at their opposite ends by any suitable form of fastening-means preferably the means for holding the rail to the support.

What I claim as new, and desire to secure by Letters Patent, is—

1. The combination with a support for a rail, of a pair of clips adapted to be applied to opposite sides of said support, means for connecting the clips together near one end, and means located near the opposite ends of the clips for securing the rail thereto and for coöperating with said first-named means in holding the clips on the support.

2. The combination with a support for a rail, of a pair of clips adapted to be applied to opposite sides of said support, interlocking means for holding the clips at one end in fixed relation on the support, and means located near the opposite ends of the clips for securing the rail thereto and for coöperating with said first-named means in holding the clips on said support.

3. The combination with a support for a rail, of a pair of clips adapted to be applied to opposite sides of said support, means for connecting the clips together near one end, and means located near opposite ends of the clips and engaging therewith from the opposite sides of the latter for securing the rail to the clips and for coöperating with said first-named means in securing the clips on the support.

4. The combination with a support for a rail, of a pair of clips adapted to be applied to opposite sides of said support, means connecting the clips together at one end, and separable key-blocks located near the opposite ends of the clips for securing the rail thereto and for coöperating with said first-named means in securing the clips on the support.

5. The combination with a support for a rail, of a pair of clips adapted to be applied to opposite sides of said support and interlock with the latter, an abutment for one side of the rail, a second abutment adjacent to the opposite side of the rail, and means engaging with said rail and said second abutment for securing the rail in place on said support.

6. The combination with a support for a rail, of a pair of clips adapted to be applied to opposite sides of said support and interlock with the latter and provided with an abutment for one side of the rail and a second abutment adjacent to the opposite side of the rail, and wedging means engaging with said rail and with said second abutment for securing the rail in place on said support.

7. The combination with a support for a rail, of a pair of clips adapted to be applied to opposite sides of said support and interlock with the latter, means for connecting the clips together near one end, an abutment on the clips for one side of the rail, a second abutment on the clips adjacent to the opposite side of the rail, and means engaging with said rail and with said second abutment for securing the rail to the clips and for coöperating with said first-named means in securing the clips on the support.

8. The combination with a support for a rail, of a pair of clips adapted to be applied to the opposite sides of said support and interlock with the latter, means for connecting the clips together near one end, an abutment on the clips for one side of the rail, a second abutment on the clips adjacent to the opposite side of the rail, and means engaging with said rail and said second abutment for securing the rail to the clips and for coöperating with said first-named means in securing the clips on the support, said last-named means being adapted to be seated in position from opposite sides of the support.

9. The combination with a support for a rail, of a pair of clips adapted to be applied to opposite sides of the support and interlock with the latter and have the rails secured to the clips, interlocking means for holding the clips at one end in fixed relation on the support, and means located near the opposite ends of the clips for coöperating with said first-named means in holding the clips on said support.

10. The combination with a support for a rail, of a pair of clips adapted to be applied to opposite sides of the support and interlock with the latter and have the rails secured to the clips, said clips having movable connection with each other adapting them to be swung at their free portions by this connection to position them on said support, and means for securing the clips together at their free portions.

11. The combination with a support for a rail, of a pair of clips adapted to be applied to opposite sides of said support and interlock with the latter and have the rails secured thereto, said clips having separable movable connection with each other adapting them to be swung at their free portions by this connection to position them on said support, and means for securing the clips together at their free portions.

12. The combination with a support for a rail, of a pair of clips adapted to be applied to opposite sides of said support and interlock with the latter and have the rails secured thereto, said clips having interlocking connection with each other adapting them to be swung at their free portions by this connection to position them on said support, and means for securing the clips together at their free portions.

13. The combination with a support for a rail, of a pair of clips adapted to be applied to opposite sides of said support and interlock with the latter and having movable connection with each other adapting them to be swung at their free portions by this connection to position them on said support, and means for securing the rail to the clips and for securing the clips together at their free portions on the support.

14. The combination with a support for a rail, of a pair of clips adapted to be applied to opposite sides of said support and interlock with the latter and having movable connection with each other adapting them to be swung at their free portions by this connection to position them on said support, and means adapted to be applied to the clips from opposite sides thereof for securing the rail to the clips and for securing the clips together at their free portions on the support.

15. The combination with support for a rail, of a pair of clips adapted to be applied to opposite sides of said support and interlock with the latter and having movable connection with each other adapting them to be swung at their free portions by this connection to position them on said support, and wedging means adapted to be applied to the clips from opposite sides thereof for securing the rail to the clips and for securing the clips together at their free portions on the support.

16. The combination with a support for a rail, of a pair of clips adapted to be applied to opposite sides of said support and interlock with the latter and having movable connection with each other adapting them to be swung at their free portions by this connection to position them on said support, and separable wedge-keys adapted to be applied to the clips from opposite sides thereof for securing the rail to the clips and for securing the clips together at their free portions on the support.

17. The combination with a support for a rail, of a pair of clips adapted to be applied to opposite sides of said support and interlock with the latter, said clips having movable connection with each other adapting them to be swung at their free portions by this connection to position them on said support, abutments on said clips against which the rail is caused to bear at a flange thereof, second abutments on said clips, and means adapted to engage said second abutments for clamping the rail in position on the clips and for securing the clips together at their free portions.

18. The combination with a support for a rail, of a pair of clips adapted to be applied to opposite sides of said support and interlock with the latter, interlocking means for holding the clips at one end in fixed relation on the support, abutments on said clips against which the rail is caused to bear at a flange thereof, second abutments on said clips, and means adapted to engage said second abutments for clamping the rail in position on the clips and for securing the clips together at their free portions.

19. The combination with a support for a rail, of a pair of clips adapted to be applied to opposite sides of said support and interlock with the latter and having movable connection with each other adapting them to be swung at their free portions by this connection to position them on said support, an abutment on the support for one side of said rail, with a seat for the rail adjacent to the abutment, and an abutment on said support below said rail-seat and adjacent to a side thereof, a lug on each of said clips bearing against the first-named abutment on said support, a second lug on each of said clips, and rail-securing keys fitting against lugs on the clips and bearing against the other flange of the rail, for the purpose set forth.

20. The combination with a support for a rail, of a pair of clips adapted to be applied to opposite sides of said support and have the rail secured thereto, said clips having movable connection with each other adapting them to be swung at their free portions by this connection to position them on said support, and means for securing the clips together at their free portions and the rail to the clips, the clips and support being so constructed as to cause portions of them to interlock with each other when the clips are applied to the support.

21. The combination with a support for a rail, of a pair of clips adapted to be applied to the support at opposite sides thereof, and a pair of keys constructed and arranged to be applied to the support from opposite sides thereof and secure the rail in place on the clips and hold the clips together, and a fish-plate integral with one of said keys, for the purpose set forth.

22. The combination with a support for a rail containing recesses affording shoulders at their opposite ends, of a pair of clips adapted to be applied to opposite sides of said support, to fit in said recesses and be secured therein, and means for securing a rail to the clips.

23. The combination with a support for a rail containing lateral recesses affording shoulders at their opposed ends, of a pair of clips adapted to be applied to opposite sides of said support and fit in said recesses, and means for securing a rail to said clips.

24. The combination with a support for a rail, of a pair of clips adapted to be applied to said support from its opposite sides, means for holding the clips in fixed relation to each other at one end, and rail-securing means formed of separable parts constructed and arranged to be introduced from opposite sides of the support into position for securing the rail to the clips and engaging with the clips for securing them together at their other ends.

25. The combination with a U-shaped support for a rail, of a pair of clips adapted to be applied to and engage with the outside and opposite sides of the upwardly extending walls of said support and interlock with the latter, and a rail-seat resting upon the bottom of the support between the walls thereof, the top of said seat having lugs adapted to interlock with said clips, for the purpose set forth.

CHARLES R. HOLDEN.

In presence of—
W. B. DAVIES,
R. A. SCHAEFER.